(12) United States Patent
Enciso et al.

(10) Patent No.: US 7,860,119 B1
(45) Date of Patent: Dec. 28, 2010

(54) SONET/SDH RING AGGREGATION

(75) Inventors: Jose L. Enciso, Santa Rosa, CA (US); Richard S. Lopez, Corte Madera, CA (US); Colm O'Brien, Novto, CA (US); Kevin Thomas Pope, Ross, CA (US); Christopher Jeffery Rust, Portola Valley, CA (US)

(73) Assignee: Meriton Networks US Inc., Wilmington, DE (US)

( * ) Notice: Subject to any disclaimer, the term of this patent is extended or adjusted under 35 U.S.C. 154(b) by 1153 days.

(21) Appl. No.: 10/728,681

(22) Filed: Dec. 5, 2003

(51) Int. Cl.
*H04L 12/56* (2006.01)

(52) U.S. Cl. .................. 370/403; 370/466

(58) Field of Classification Search .............. 370/403
See application file for complete search history.

(56) References Cited

U.S. PATENT DOCUMENTS

| | | | | |
|---|---|---|---|---|
| 5,097,469 | A * | 3/1992 | Douglas | 370/452 |
| 5,568,487 | A * | 10/1996 | Sitbon et al. | 370/466 |
| 5,864,542 | A * | 1/1999 | Gupta et al. | 370/257 |
| 6,011,802 | A * | 1/2000 | Norman | 370/466 |
| 6,064,674 | A * | 5/2000 | Doidge et al. | 370/398 |
| 6,175,552 | B1 * | 1/2001 | Parry et al. | 370/222 |
| 6,631,130 | B1 * | 10/2003 | Roy et al. | 370/401 |
| 6,717,953 | B1 * | 4/2004 | Heuer et al. | 370/466 |
| 6,721,353 | B1 * | 4/2004 | Taubert et al. | 370/466 |
| 6,747,982 | B2 * | 6/2004 | Nakatsugawa | 370/403 |
| 6,778,541 | B2 * | 8/2004 | Houston et al. | 370/401 |
| 6,856,620 | B1 * | 2/2005 | Dunsmore et al. | 370/395.1 |
| 7,130,276 | B2 * | 10/2006 | Chen et al. | 370/401 |
| 7,221,904 | B1 * | 5/2007 | Gavrilovich | 455/11.1 |
| 7,353,288 | B1 * | 4/2008 | Rangavajjhala et al. | 370/466 |
| 2001/0021171 | A1 * | 9/2001 | Notani | 370/222 |
| 2002/0075903 | A1 * | 6/2002 | Hind | 370/477 |
| 2002/0085591 | A1 * | 7/2002 | Mesh et al. | 370/535 |
| 2003/0118041 | A1 * | 6/2003 | Fontana et al. | 370/404 |
| 2003/0174713 | A1 * | 9/2003 | Linden | 370/396 |
| 2004/0042462 | A1 * | 3/2004 | O'Neill et al. | 370/395.5 |
| 2004/0136389 | A1 * | 7/2004 | Hunneyball | 370/406 |
| 2006/0133413 | A1 * | 6/2006 | Bousis | 370/466 |

* cited by examiner

*Primary Examiner*—Chirag G Shah
*Assistant Examiner*—Joshua Smith
(74) *Attorney, Agent, or Firm*—Workman Nydegger

(57) ABSTRACT

SONET/SDH ring aggregation with distributed traffic. The system may include a packet-switched fabric adapted to switch TDM and PDU over the same fabric. The system provides logical functionality of one or more of SONET/SDH ADMs, fiber patch panels, coax patch panels, DCSs, and packet switches. Integrated management provides management of remote ADMs attached to multiple SONET/SDH rings, even of ADMs manufactured by different vendors. A management system may provide native termination of OSI over DCC and IP over DCC to provide integration of equipment from various vendors.

36 Claims, 6 Drawing Sheets

SONET/SDH RING AGGREGATION

FIELD

The disclosure relates to network switching. Specifically, the disclosure relates to aggregation of SONET/SDH rings.

BACKGROUND

As the demand for interconnectivity increases, more and higher-speed network and internetwork connection are made. One example is the increase in fiber optic networks that provide higher-bandwidth connections. Many networks transfer data according to synchronous data transmission standards. For examples, signals on fiber lines may be transmitted over the fiber lines according to the Synchronous Optical NETwork (SONET) or Synchronous Digital Hierarchy (SDH) standards.

Often fiber cables are interconnected in ring topology. A system of fiber cables is run between individual network elements (NEs), such as an Add/Drop Multiplexer (ADM). The interconnection between the discrete NEs provides a complete loop to provide better protection against failure of any interconnection between two discrete NEs on the network. Because of the looping nature of the network, i.e., the ring interconnections on the SONET/SDH network, if a given interconnection on the network were to fail, an alternate path would be available to provide routing for signals. The SONET/SDH networks including their associated rings are terminated in a central office (CO) or other switching center, to provide interconnection across rings to allow an NE to communicate outside its particular ring.

For every SONET/SDH ring terminated at the CO, there is traditionally a central office ADM. The central office ADM terminating the ring is generally called a Gateway Network Element (GNE), acting as the gateway communication path for signals interconnecting with the ring. When a GNE ADM is used to terminate each ring, each such ADM is interconnected with other devices in the CO via fiber patch panel or coax patch panels. Other devices in the CO may include other GNE ADMs, Digital Cross-connect Systems (DCSs), and packet switches. Some traffic is dropped locally from the patch panels to equipment within the same CO.

FIG. 1 illustrates a prior art CO as described. CO 101 has a GNE ADM 111 and 121 for each ring in networks 110 and 120, respectively. Note that each network 110 and 120 may include multiple SONET/SDH rings, as depicted in FIG. 1. To interconnect the rings in the networks shown, traditional systems have required the use of break-out panels. Break out panels, such as patch panel 130 uses a dedicated coax or fiber line to be run from the termination ADM to the panel, and a corresponding dedicated link from the panel to the switches. Thus, there is no inter-ring intelligence, and traffic from different rings cannot be directly switched. Patch panel 130 may be one or multiple physical devices that interconnect ADMs 111 and 121 to each other, or with other elements within CO 101. Patch panel 130 may include fiber patch panels and/or coax patch panels (e.g., DSX-3, meaning a Digital Signal Cross-connect for DS-3 (Digital Signal-level 3, 44.736 Mbps) signal switching).

Patch panel 130 interconnects with TDM (Time-Division Multiplex) cross-connect system 140 and packet switch 150. Traffic on networks 110 and 120 may include TDM and PDU (Protocol Data Unit, i.e., packet-switched) traffic. Traditional CO systems, such as system 100, switch TDM and PDU traffic in separate switching systems. Thus, ADMs 111 dedicated to carrying TDM traffic are interconnected via patch panel 130 to TDM cross-connect system 140, which will have a TDM switching fabric appropriate for providing deterministic routing of TDM traffic (using deterministic circuit-switched routing). In a similar fashion, ADMs 111 dedicated to carrying PDU traffic are interconnected via patch panel 130 to packet switch 150, which will have a packet-switched fabric for switching packetized data.

Some traffic in system 100 will be dropped locally to other devices within CO 101. ADMs 111 and 121 are interconnected to such local elements, illustrated as local dropped traffic 180, via patch panel 130.

It will be appreciated that the volume of interconnections requires a great deal of equipment and space. There is also a proportional need for power to operate all the equipment placed in the CO, as well as costs associated with upkeep of system 100. For example, adding or eliminating network elements may require service to CO 101 that could require multiple physical links to be nm with cables, often requiring running of cables over many floors of a building. Each such NE requires connection to a patch panel and/or break-out box.

Note also that each element of CO 101 requires a separate connection with management systems 170. Thus, management network 160 is shown connected to TDM fabric TDM cross-connect system 140, packet switch 150, and each individual GNE ADM 111 and 121 (shown by the multiple interconnection lines of 161 and 162) in CO 101. Management systems 170 have separate connections through management network 160 for each separate device. The collection of SONET/SDH rings 110 and 120 are each treated as a disparate network. There is no ring-to-ring knowledge or intelligence sourced from CO 101.

Thus, to communicate to ADM 112 on network 110, a discrete connection from management systems 170 carries a signal through management network 160 to GNE ADM 111, which forwards the signal to ADM 112. A similar pattern is followed to communicate with ADM 122 on network 120. Note that ADMs 111 and 121 are shown as potentially multiple devices, because multiple rings may be present in networks 110 and 120. Each of these multiple GNE ADMs represented by ADMs 111 and 121 are unable to communicate with each other directly.

Another drawback with system 100 is that management system 170 cannot derive a complete network topology of the networks connected to CO 101. Equipment such as ADMs 111 and 121 are available from a variety of vendors, and each vendor's equipment may or may not be interoperable with equipment from another vendor. One such condition giving rise to the lack of native interoperability is that equipment may use different management protocol schemes. Different protocol channels are possible over the Data Communications Channel (DCC) network that interconnects ring termination equipment. Two popular protocols currently used are Internet Protocol (IP) and Open System Interconnection (OSI), including different implementations of these base protocols. Traditional methods of dealing with differing protocols at best has involved tunneling one protocol through the other, which means there will be certain elements that will not be "visible" to the network management.

BRIEF DESCRIPTION OF THE DRAWINGS

The disclosure is illustrated by way of example, and not by way of limitation, in the figures of the accompanying drawings in which like reference numerals refer to similar elements.

DETAILED DESCRIPTION

A method and system is described to provide SONET/SDH Ring Aggregation (SRA). An SRA system as described herein provides integrated interconnection of SONET/SDH rings. A distributed tributary routing allows for better utilization of bandwidth at the Central Office (CO). An SRA system may have an integrated platform that performs logically the functions of the traditional discrete elements, such as: SONET/SDH Add/Drop Multiplexers (ADMs), fiber patch panels, coax patch panels, Digital Cross-connect Systems (DCSs), and packet switches. The integrated system allows for integrated management of ADMs attached to multiple SONET/SDH rings.

Figure 1:
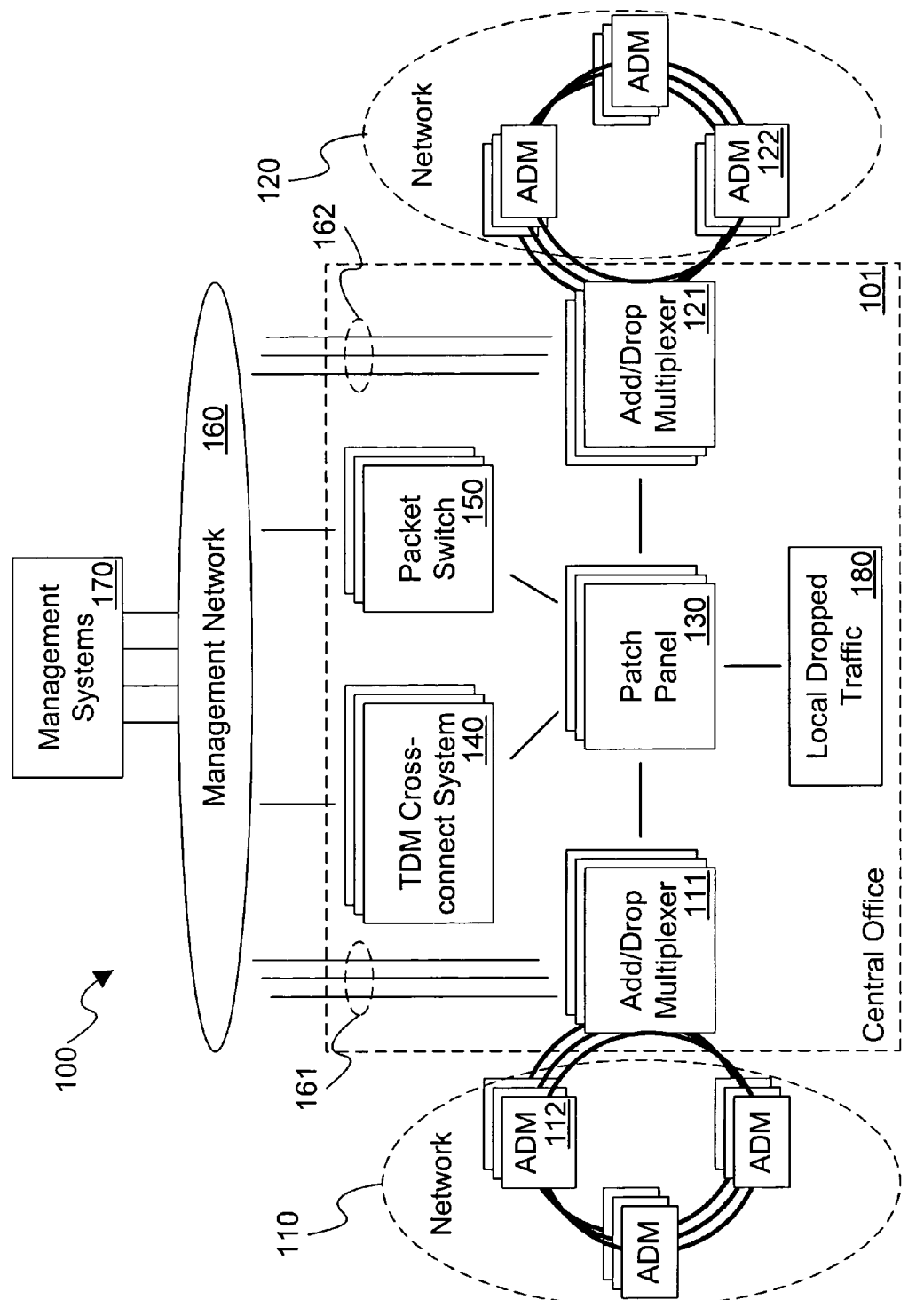
FIG. 1 is one embodiment of a prior art central office termination system.
Figure 2:
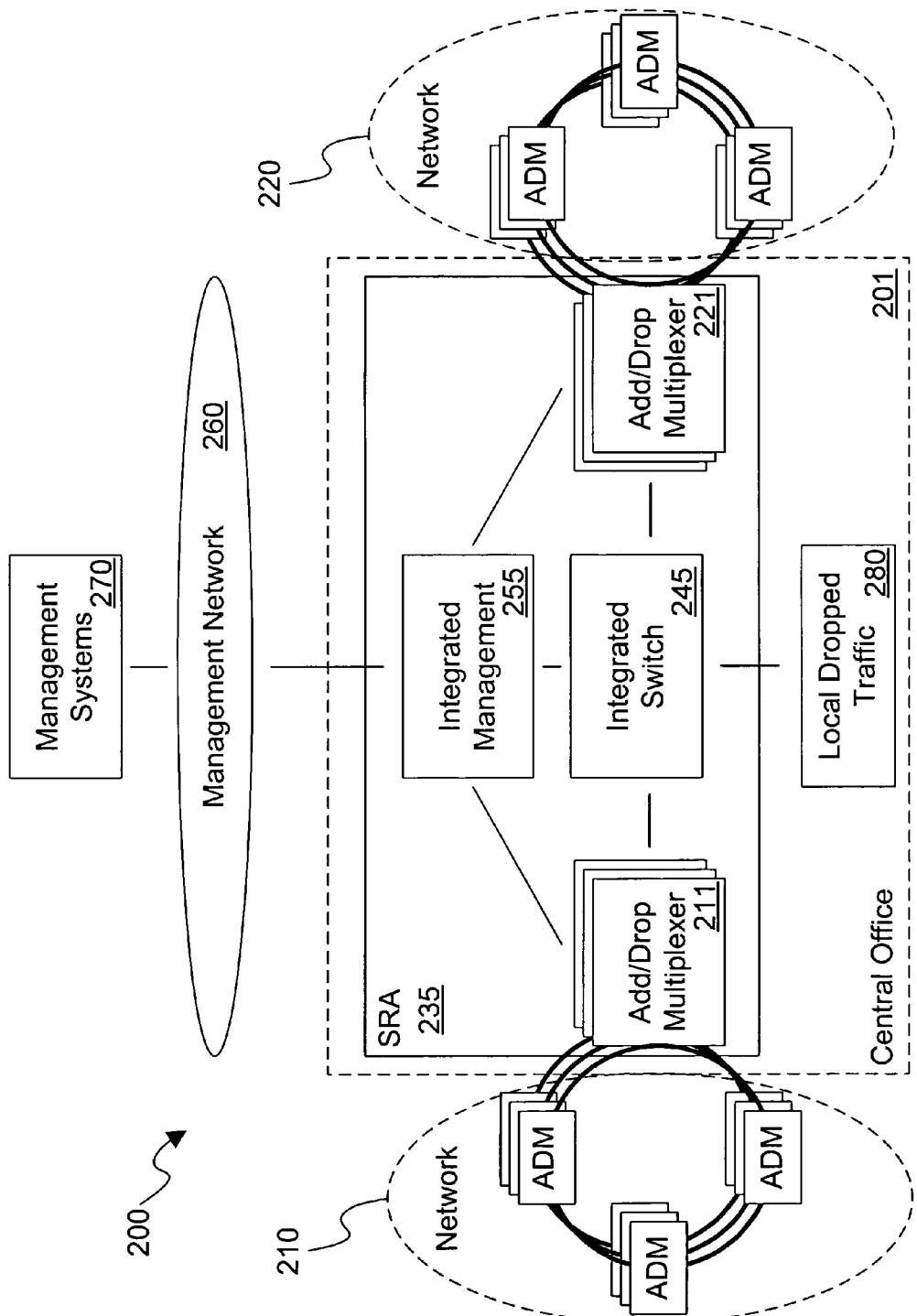
FIG. 2 is one embodiment of a central office termination system.

FIG. 2 is one embodiment of a central office termination system. System 200 implements SRA with an integrated interconnect system that combines many of the functions implemented traditionally as discrete elements in a central office. Central office (CO) 201, as in FIG. 1, terminates multiple SONET/SDH rings on networks 210 and 220. Networks 210 and 220 may each include multiple SONET/SDH rings, terminated on a Gateway Network Element (GNE) ADM. Note, however, that the GNE ADMs are integrated into SRA element 235. SRA 235 is a SONET/SDH ring aggregation system with integrated interconnections, as will be more fully described below.

SRA 235 is a switching module that includes integrated switch 245 that includes the functions of both a TDM cross-connect system and a packet switch. In one embodiment, integrated switch 245 is a combined TDM/PDU fabric system with an overlaid synchronous frame structure on a packet-based switch fabric. For example, a synchronized timing overlay establishing a frame of timeslots on which to send cells of data, whether TDM or PDU, could be used with a cell/packet-based switching fabric. To provide the deterministic switching necessary for TDM traffic, the synchronous timing overlay would work in conjunction with a pre-scheduling procedure that results in conflict-free scheduling of TDM traffic. For more information on a synchronous frame structure overlay, see U.S. patent application Ser. No. 10/728,466, entitled "TDM Services Using a Packet-Switched Fabric," filed concurrently herewith on Dec. 5, 2003, and assigned to the same assignee, and incorporated herein by reference.

In one embodiment, SRA 235 includes integrated management 255, which acts as a management communication gateway to elements of CO 201. Rather than requiring the costly and burdensome one-to-one interconnection of discrete devices with management systems 270, as required by traditional systems, integrated management 255 interconnects with the discrete elements and provides a single interconnection to management systems 270 for all elements of SRA 235. In one embodiment the elements of SRA 235 are combined in a single system, with interconnection of integrated management 255 possible over a management bus that connects to termination and switching circuits that physically house ADMs 211 and 221. For example, a set of linecards may be used to provide the ADM functions of ADM 211 and/or 221, the linecards interconnecting with integrated switch 245. Thus, ADMs 211 and 221 may be physical ADM devices as is known in the art, or they may exist logically in the functionality of, e.g., a linecard in SRA system 235. Thus, rather than racks of expensive equipment, with miles of interconnection cables necessary to provide interfacing of the equipment with other elements in CO 201 including management systems 270, SRA 235 provides for a more compact system that can integrate many of the necessary interconnections into the system, for example, on Printed Circuit Board (PCB) interconnections and/or on shorter coax and/or fiber links between elements of a system located physically proximate to each other. The shorter links are possible because of the integration of system elements that allows placing within the same physical rack what in the past may have been implemented by racks full of CO equipment.

SRA 235 also interconnects with other elements of system 200 in CO 201, as illustrated by the connection to the generic symbol local dropped traffic 280. As with the similar element of FIG. 1, local dropped traffic 280 represents elements to which traffic will be dropped off locally within CO 201, e.g., a voice switch. Note that local dropped traffic 280 would include any interconnection elements necessary to interconnect with SRA 235, for example, Fiber Patch Panels (FPPs) or DSX-3s, etc.

Figure 3:
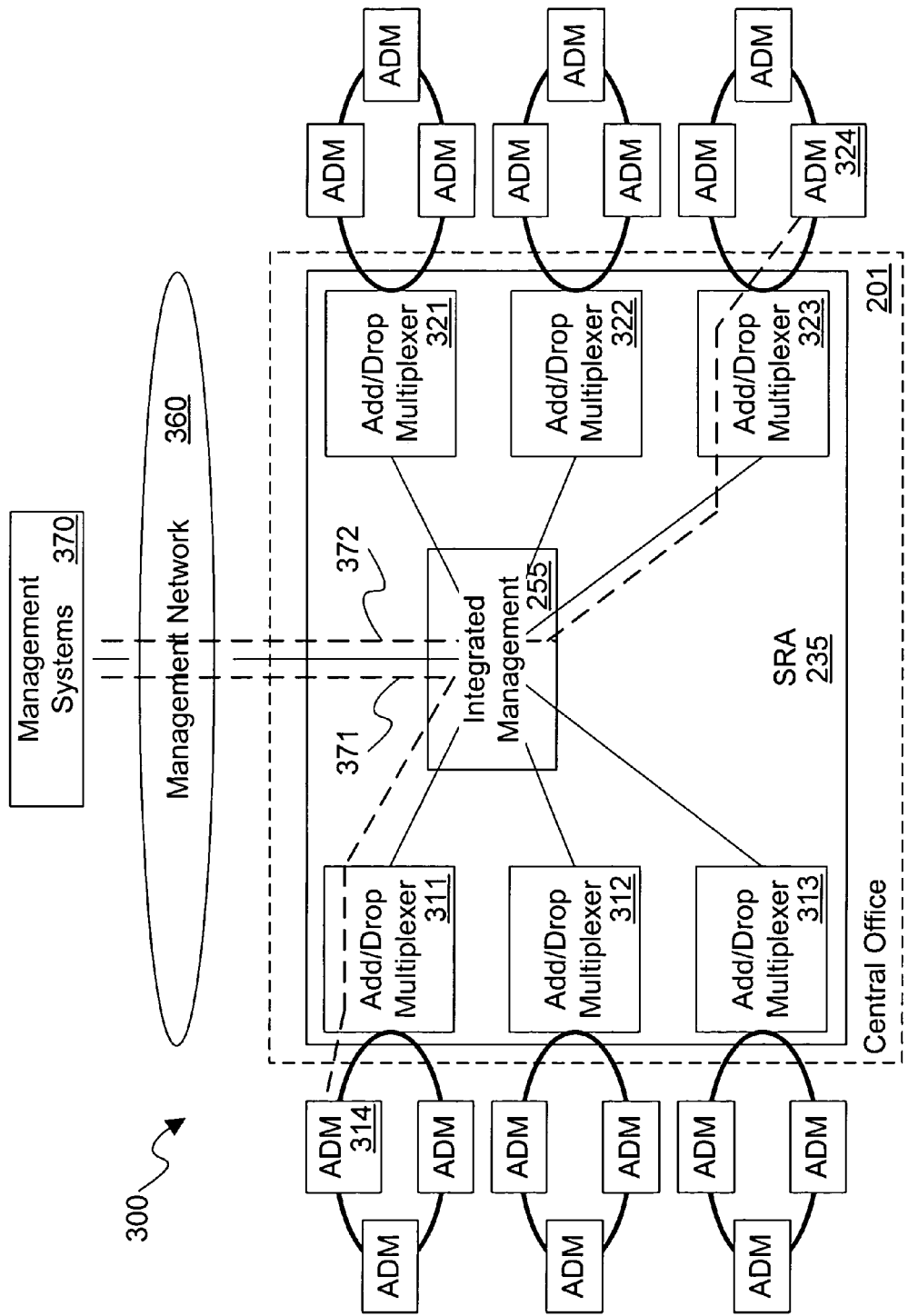
FIG. 3 is one embodiment of integrated management of a SONET/SDH ring aggregation SRA system.

FIG. 3 is one embodiment of integrated management of an SRA system. System 300 includes management systems 370, management network 360, and CO 201 with multiple rings terminated on SRA 235. Management systems 370 and management network 360 may or may not physically be located at CO 201. Management network 360 may include interconnection links between management systems 370 and elements of system 300. It may also include equipment necessary, such as repeaters, to provide signals to elements of system 300 from management systems 370.

Because SRA 235 has integrated management 255 that acts as a management gateway element, or management gateway, between management systems 370 and the elements of SRA 235, management communications intended for any element of SRA 235 may be transmitted to integrated management 255 that acts as a single access point to management systems 370 for elements of SRA 235. Integrated management 255 may interconnect some or potentially all elements of CO 201 to management systems 370.

In one embodiment ADMs are managed via a dedicated management channel, called the Data Communication Channel (DCC), within a SONET/SDH connection. ADM vendors have implemented management channels within the DCC using either IP- (Internet Protocol) or OSI-based (Open System Interconnection) networking protocol stacks. Not only is DCC communication broken into IP and OSI, there are multiple different, incompatible applications of these protocol stacks. Many vendors make many discrete components for CO 201 that will all be compliant with their individual implementation of the DCC protocol stack selected, but may not be compliant with the application of protocol stacks selected by other vendors. Because a vendor would prefer that a customer only purchase equipment from the single vendor, there has been little motivation in the industry to provide a system that supports management channels using different protocols and/or different applications of the same protocol.

In one embodiment SRA 235 simplifies the interconnection of discrete components of system 300 to management systems 370 by providing support for multiple protocol-based management channels. Thus, integrated management 255 provides an integrated management bus that natively supports IP and/or OSI channels to/from ADMs in system 300, and provides a single management communication signal to management network 360 to management systems 370. For example, assuming the rings including ADMs 314 and 324 used equipment supplied by different vendors, they may employ traditionally incompatible management channels, such as IP and OSI, or different implementations of OSI. Traditionally, ADMs 311 and 323 would have to be supplied from the same vendor and one of the ADMs would not be natively supported by management systems 270. Integrated management 255 supports multiple protocols, and can natively support the equipment in the rings terminated on ADMs 311 and 323, even though they are supplied by different vendors. Thus, if the specific protocol stacks employed by the rings terminated on ADMs 311 and 323 are known, integrated management 255 can be adapted to provide support for both.

In addition to providing for a simplified management scheme by providing a single access point, with multiple SONET/SDH rings aggregated by SRA 235 with integrated management 255, alarms and circuit management can be presented to management systems 370 as a complete whole. Furthermore, because SRA 235 provides native termination of multiple protocol stacks, including IP and different applications of OSI, management systems 370 receives a complete view of the topology of the rings terminated on system 300. Thus, each element of system 300 appears to be visible to management systems 370. In this manner, rather than viewing the networks as isolated elements, management systems 370 can derive a complete network topology. With traditional systems that rely on tunneling one protocol through the other (e.g., tunneling IP through OSI), there would be no way for management systems 370 to obtain a complete view of system 300.

Because all discrete elements of system 300 are known to a common element, SRA 235, ring-to-ring interconnection is possible in a way that is not possible with traditional systems. For example, the SONET/SDH ring terminated on ADM 311 is able to communicate inter-ring with the ring terminated on ADM 312 that is part of the same SONET/SDH network. This is explained further below.

When lower-level optical carrier signals or digital signals are combined into a single, higher-level signal, the lower level signal is said to be a tributary of the higher level traffic stream. Traditionally tributaries are restricted to mapping onto a single access ring. In one embodiment SRA 235 has an integrated TDM/PDU switching fabric, as well as the integrated management that natively supports OSI and IP, giving inter-ring awareness. This inter-ring awareness enables system 300 to provide distributed routing of tributaries across multiple access rings.

To fully appreciate the interplay of the various parts of the discussion of FIG. 3, consider management signal 371 desired to be sent to/from management systems 370 from/to ADM 314, and similarly management signal 372 between management systems 370 and ADM 324. Regardless of the protocol supported by ADMs 314 and 324, because of the native protocol support of the protocols used by these remote ADMs, and the system-wide view communicated to management systems 370 by integrated management 255, management systems 370 is aware of both ADMs, and can transfer signals 371-372 to them. Furthermore, tributaries destined for the rings subtended by ADMs 311-313 can be distributed over multiple of the access rings 311-313 (only three rings are shown for purposes of illustration; the teachings herein would hold true for systems having more rings). In one embodiment an InterProcessor Communication (IPC) channel between integrated management 255 and devices in SRA 235 supports IP over DCC as well as OSI over DCC for multiple applications of OSI to enable the functions described above.

Figure 4:
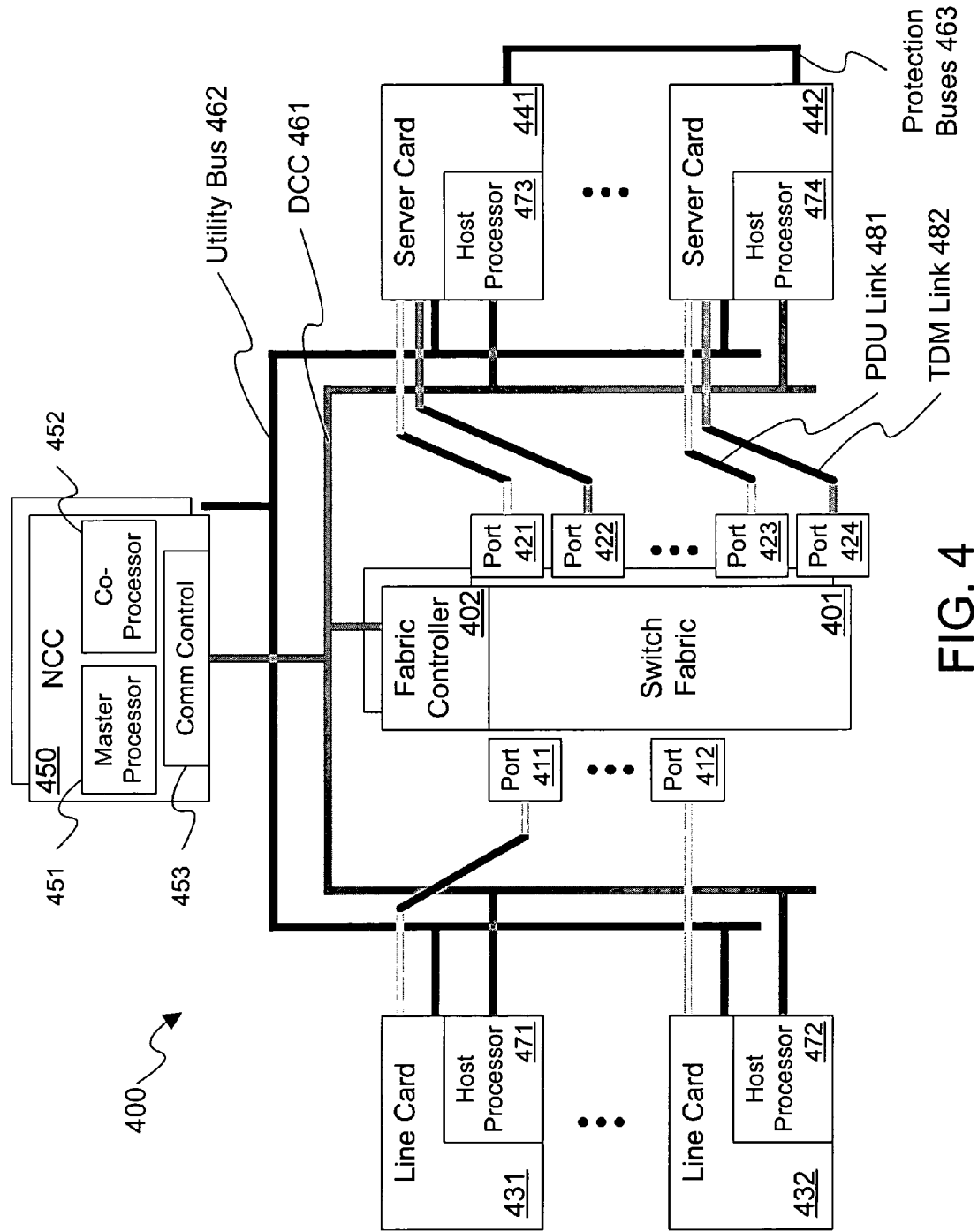
FIG. 4 is one embodiment of elements of a SONET/SDH ring aggregation system.

FIG. 4 is one embodiment of elements of a SONET/SDH ring aggregation system. SONET/SDH rings are aggregated by joining traffic from multiple lower-level Optical Carrier (OC) signals into a higher-level OC signal. Traditionally this has been done with racks full of equipment requiring numerous physical connections to be made. System 400 allows for SRA to be performed by a system that digitally collapses many of the discrete components of former CO systems. In one embodiment system 400 provides for this integration by its joint TDM and PDU switching system on the signal end of the system, as well as the ability to provide native termination of both OSI and IP DCC communications on the management end of the system.

System 400 provides SRA for rings of traffic that may be TDM, PDU, or a combination. In one embodiment, switch fabric 401 supports both PDU and TDM traffic on a single, integrated packet-switched fabric with a synchronous timing overlay and pre-scheduling, as discussed above. The switch of system 400 logically includes switch fabric 401, fabric controller 402, and ports 411-412 and 421-424, even though they may physically be separate and/or in a different configuration than that shown. For example, the elements depicted in FIG. 4 do not limit the scope of system 400, but are for purposes of illustration. Thus, switch fabric 401, fabric controller 402, and ports 411-412 and 421-424 may be physically part of the same system element, or may be located on discrete physical devices. Note also that the number of elements depicted is not limiting on system 400. Switch fabric 401 and fabric controller 402 are shown shadowed in FIG. 4, in that there may be physical partitions of the switch system, each partition having one or more physical circuits. For example, switch fabric 401 may consist of two separate 320 Gbps switching fabric cards, with associated fabric controller cards 402. Other physical partitioning of system 400 is possible.

The switching system of system 400 provides routing for signals to and from line cards 431 and 432, and for server cards 441 and 442. For more information on a server cards, see U.S. patent application Ser. No. 10/728,656, entitled "Virtual Tributary Processing Using Shared Resources," and U.S. patent application Ser. No. 10/728,646, entitled "Packet Processing Using Shared Resources," both filed concurrently herewith on Dec. 5, 2003, assigned to the same assignee, and both incorporated herein by reference.

Line cards 431-432 are generally thought of as circuits that transceive signals to/from SONET/SDH networks, also called access ring communication, while server cards 441-442 are generally thought of as circuits that transceive signals to/from facilities in other COs or equivalents, also referred to as Inter Office Facilities (IOF) communication. Multiple line cards 431-432 may be present, depending on the implementation desired for system 400 and the number of rings desired to be terminated. If more line cards were added, there may be an increase in the number of corresponding ports 411-412. There may also be more server cards 441-442 and ports 421-424.

The number of cards in a system is variable, because system 400 may be a modular system with pay-as-you-grow upgradability. That is, the number of line cards 431-432 and/or server cards 441-442 may be increased or decreased depending on the traffic load experienced on system 400. Such a design allows for use of a few cards to handle small traffic loads, and more cards can be added as the amount of traffic increases. The traffic increase may be TDM or PDU traffic, and the switching system of which switch fabric 401 is a part will be unaffected. In one embodiment a TDM linecard may be added when an increase in TDM traffic is desired, and similarly a PDU linecard for an increase in packet-switched traffic. The ability to grow modularly can be of tremendous benefit to long-term profitability, because system elements are only bought, installed, and maintained according to need. Because of the digital nature of the equipment of system 400, much of the routine maintenance and system support can be performed with a great decrease in the number of physical connections that must be added, removed, and/or replaced.

In one embodiment ports 421-424 are separated according to traffic, so that server card 442 connects to port 423 via PDU link 481 dedicated to PDU traffic, and to port 424 via TDM link 482 dedicated to TDM traffic. Thus, in this particular case, for every server card in system 400, there may be two ports associated with transceiving IOF traffic over the server card.

System 400 also includes network controllers to manage the switching network. In FIG. 4, there is shown Network Controller Card (NCC) 450. There may be more than one physical circuit that makes up NCC 450, and the number may correspond to a number of physical partitions of switch fabric 401. NCC 450 includes a master processor 451 to manage system 400, a co-processor 452 to provide extra computational functionality for processor 451, and communication (comm) control 453 to provide communication throughout the system. Comm control 453 may operate, for example, over Ethernet.

Comm control 453 manages a DCC 461 between NCC 450 and elements of system 400. In one embodiment each line card 431-432 and each server card 441-442 includes a host processor 471-474, respectively, to provide communication over DCC 461 to NCC 450. Fabric controller 402 also connects to DCC 461 to provide system-wide communication to/from the switching system. DCC 461 includes DCC(s) for communication among various discrete elements of system 400. The elements will communicate in the particular protocol supported by the elements, either OSI or IP. Note that DCC 461 may include multiple physical interconnections, as may be the case, for example, if NCC 450 included multiple physical circuits. In one embodiment there may be a number of DCC 461 lines corresponding to a number of circuits of NCC 450, one for each circuit. Thus, if there were two NCC 450 cards, there may be two IPC 461 channels.

There may also be other bus(es) interconnecting NCC 450 with the discrete cards and/or circuits and/or comparable elements of system 400. A generic utility bus 462 is shown, and may also include a number of physical lines, depending on the physical setup of system 400. Utility bus 462 may include, for example, an out-of-band (OOB) communication channel to each card 431-432 and 441-442 in system 400.

Server cards 441-442 may also be provided with inter-server-card protection buses 463. The protection scheme may be 1:1 or 1:N, depending on the implementation desired for system 400. A 1:1 scheme means there is a standby card for every termination card. If one of the termination cards were to fail, traffic would automatically be redirected to the standby card and the system would indicate the card failure. In a 1:N scheme, management operates so as to have a standby card available for every N termination cards. Thus, if any one of N designated termination cards were to fail, traffic would be redirected to the standby card for that group. This distributed protection provides for lower system cost in terms of equipment and space.

Figure 5:
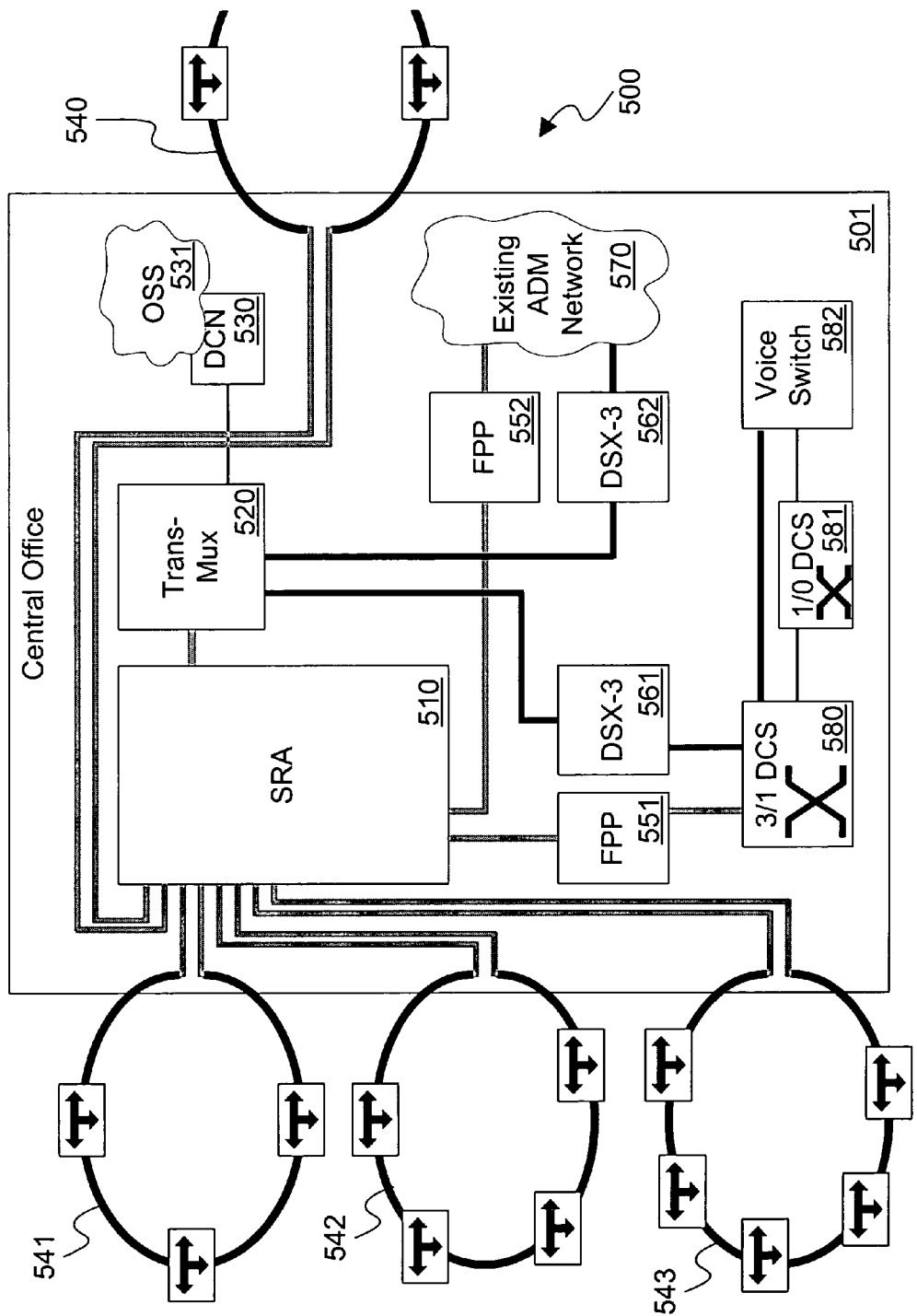
FIG. 5 is one embodiment of a central office termination system.

FIG. 5 is one embodiment of a central office termination system. System 500 is shown with CO 501 terminating various different SONET/SDH rings. CO 501 includes various system elements to provide for aggregating the SONET/SDH rings and switching the traffic. SRA 510 is similar to SRA elements discussed in sufficient detail above. In one embodiment transmultiplexer (transmux) 520 interfaces between SRA 510 and electrical interconnect equipment. For example, SRA 510 may terminate optical lines coming from access rings 541-543 and IOF ring 540. SRA 510 then transmits to transmux 520 signals that require electrical breakout, and transmux 520 transmits the signals to various elements of CO 501.

For example, transmux 520 is shown interconnected with DSX-3s (Digital Signal Cross-connects-level 3) 561-562. DSX-3s 561-562 may be digital patch panels that provide an interconnection to 3/1 Digital Cross-connect System (DCS) 580, or to electrical equipment in existing ADM network 570. System 500 shows an integration of the SRA system discussed herein with existing equipment in a CO. Thus, existing ADM network 570 may include various amounts of equipment, including multiple discrete ADMs in CO 501. In this way SRA 510 and transmux 520 may be incorporated into CO 501 that already has a substantial amount of equipment in place, and provide for additional service, while allowing for future growth, and/or eventual displacement of some existing equipment.

In one embodiment transmux provides interconnection via DS-3 coax to DSX-3s 561-562. Note that the DS-3 interconnections are displayed in black, thick lines in FIG. 5. Note also that the line interconnecting transmux 520 to, e.g., DSX-3 561 may represent one or multiple connections. In one embodiment a single line provides for 48 DS-3s. Note also that optical interconnections are displayed in dark gray in FIG. 5. These interconnections are shown by way of illustration, and not limitation, and should be understood as providing possible interconnections, and not interconnection requirements. Thus, SRA 510 terminates optical lines from the SONET/SDH rings 540-543, and provides optical interconnections to Fiber Patch Panels (FPPs) 551-552. As with the interconnections between transmux 520 and its interconnected elements, the fiber line shown in FIG. 5 is not limited to representing a single fiber line, but may represent multiple interconnecting lines between the various elements shown.

SRA 510 may provide an optical interconnection for transfer of traffic between SRA 510 and 3/1 DCS 580 through FPP 551. SRA 510 may also utilize FPP 552 to provide fiber interconnections with elements in existing ADM network 570. In one embodiment, CO includes voice switch 582. 3/1 DCS 580 interconnects with FPP 551 and/or DSX-3 561 for signals to/from voice switch 582, and may interconnect with voice switch 582 via DS-3 or DS-1 through I/O DCS 581.

Data Communication Network (DCN) 530 may interconnect with transmux 520 to provide a management link between both SRA 510 and transmux 520 and Operational Support Systems (OSS) 531. OSS 531 may include some or all of the features of management systems discussed previously, and may include other features not mentioned. For example, OSS 531 may include user interface that allows machine and/or human administrator access to the system for purposes of maintenance or troubleshooting. OSS 531 may include software that allows an administrator to view a complete topology of system 500. The connection between transmux 520 and DCN 530 may be via an Ethernet Local Area Network (LAN) connection.

In one embodiment SONET/SDH rings 540-543 to be aggregated in CO 501 interconnect with SRA 510 via fiber optic links. As mentioned above, ring 540 is typically referred to as an Inter-Office Facilities, or IOF, ring. The elements shown on IOF link 540 may be ADMs that interface the link with other COs. IOF ring 540 may be, for example, an OC-48/192 link, depending on the configuration of system 500.

Access rings 541-543 provide access to facilities joining up to high-bandwidth fiber interconnections. Access rings 541-543 may include any number of elements, and may be of varying carrier speeds. For example, in one embodiment access ring 541 may be an OC-3 ring, access ring 542 may be an OC-12 ring, and access ring may operate at OC-48. The specific configuration of the rings is not limiting, and these are simply shown for purposes of illustration in FIG. 5. In one embodiment SRA 510 supports termination of 64 different OC-48 rings, or their equivalent.

Figure 6:
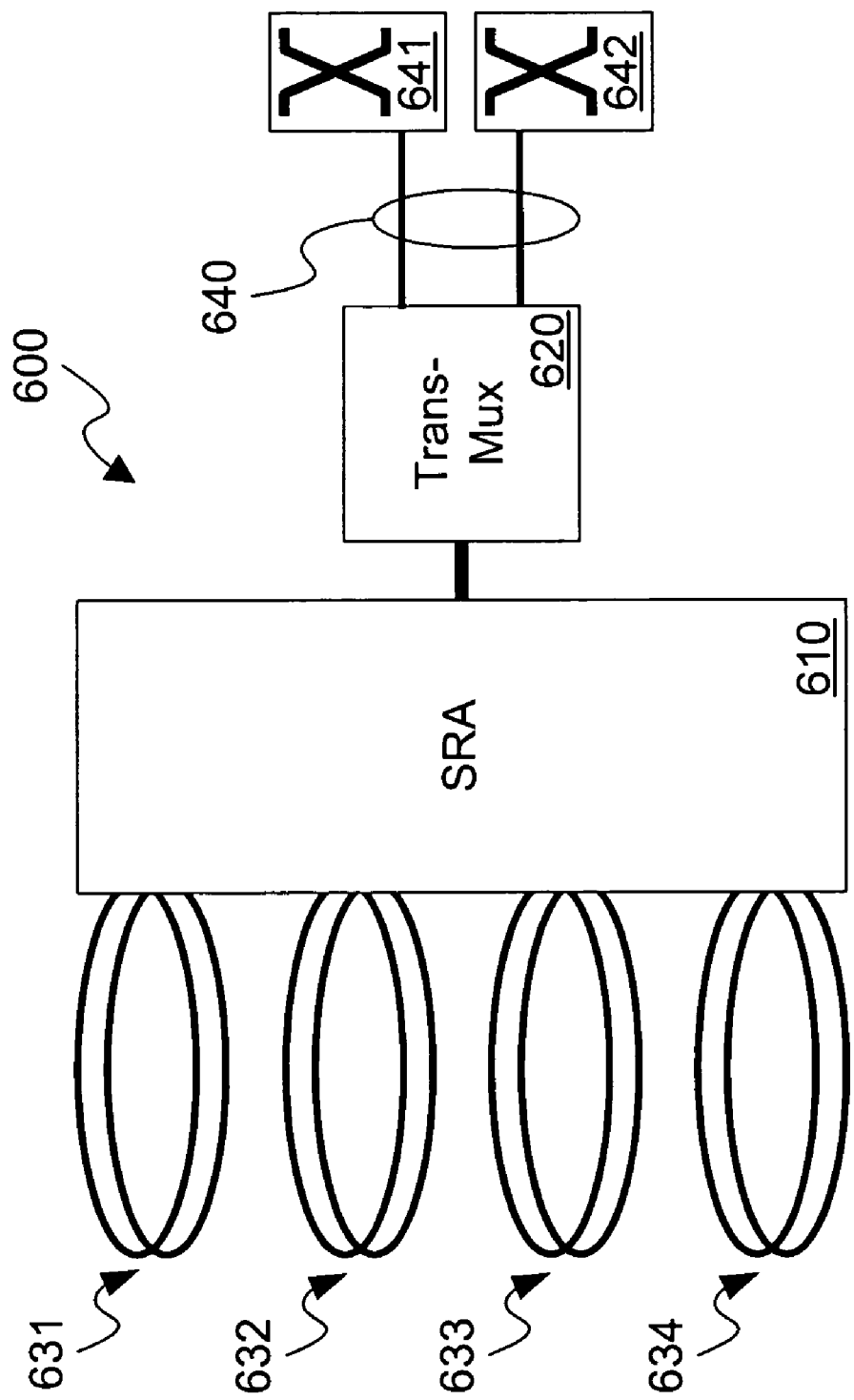
FIG. 6 is one embodiment of a SONET/SDH ring aggregation system.

FIG. 6 is one embodiment of a SONET/SDH ring aggregation system. System 600 is adapted to provide distributed sharing of tributaries across multiple rings. Bandwidth is used most efficiently when the highest possible allocation of available bandwidth is made. Thus, system 600 will operate more efficiently when the utilization of links 640 is high. In traditional systems, the physical partitioning of the system precludes high-efficiency bandwidth utilization of the interconnection equipment. This is because equipment terminating on a traditional CO on a particular access ADM will require routing through specific equipment physically linked to the access ADM, thus limiting a tributary to a particular access ring.

However, system 600 utilizes SRA as discussed herein, with SRA 610. This allows system 600 to aggregate traffic from multiple SONET/SDH rings over a selective few cross-connecting elements and distribute traffic from a single stream to multiple rings. This allows for system growth according to traffic load, rather than according to the number of connections supported. For example, SONET/SDH rings 631-634 may operate at various load levels, and still system 600 is able to aggregate traffic from among the various rings 631-634 across switching elements 641-642 because of the ability of SRA 610 to partition and distribute traffic.

To illustrate, consider system 600 where rings 631-632 are low utilization rings (e.g., 20% fill), rings 633 are medium utilization rings (e.g., 55% fill), and rings 634 are high utilization rings (e.g., 85% fill). Consider further that each of rings 631-634 is an OC-48 ring. Rather than requiring corresponding low utilization switching elements including cross-connects, distributed tributary sharing allows for high utilization of links 640 between transmux 620 and switching elements 641-642. For example, if switching elements allow for 48 DS-3s as input, system 600 will operate at approximately 90% fill internally, even though the terminated rings are of varying utilization, as set forth above.

Reference herein to "one embodiment" or "an embodiment" means that a particular feature, structure or characteristic described in connection with the embodiment is included in at least one embodiment of the present invention. Thus, the appearance of phrases such as "in one embodiment" describe various embodiments of the invention, and do not necessarily all refer to the same embodiment. Besides the embodiments described herein, it will be appreciated that various modifications may be made to embodiments of the invention without departing from their scope. Therefore, the illustrations and examples herein should be construed in an illustrative, and not a restrictive sense. The scope of the invention should be measured solely by reference to the claims that follow.

What is claimed is:

1. A switching module system comprising:
   a first hardware gateway network element including a gateway ADM (Add/Drop Multiplexer) for a switching center that interconnects multiple networks, to terminate a synchronous data transmission ring to provide a communication path for signals between the synchronous data transmission ring and network locations external to the synchronous data transmission ring;
   a second hardware gateway network element including a gateway ADM (Add/Drop Multiplexer), to terminate an additional synchronous data transmission ring to provide a communication path for signals between the additional synchronous data transmission ring and network locations external to the additional synchronous data transmission ring, where the synchronous data transmission ring and the additional synchronous data transmission ring operate according to different protocols;
   a central switching core to directly interconnect the first and second gateway network elements; and
   a management hardware element to interconnect the first and second gateway network elements with a central management system, the management element to natively communicate with the first and second gateway network elements and the central management system in their respective protocols, the central management system to provide management signals to direct traffic flow on the synchronous data transmission rings.

2. A switching module according to claim 1, wherein the first and second gateway network elements comprise network elements manufactured by different vendors.

3. A switching module according to claim 1, wherein the gateway network elements terminating a synchronous data transmission ring comprises the gateway network elements terminating a Synchronous Digital Hierarchy (SDH) ring.

4. A switching module according to claim 1, wherein the gateway network elements terminating a synchronous data transmission ring comprises the gateway network elements terminating a Synchronous Optical Network (SONET) ring.

5. A switching module according to claim 1, wherein the central switching core includes a packet-based switching fabric overlaid with a synchronous frame structure.

6. A switching module according to claim 5, wherein the central switching core comprises a switching platform to switch a traffic stream tributary across the one and the additional synchronous data transmission rings.

7. A switching module according to claim 5, wherein the first gateway network element comprises a Protocol Data Unit (PDU) traffic stream termination card and the second gateway network element comprises a Time-Division Multiplex (TDM) traffic stream termination card, and the central switching core switches both streams.

8. A switching module according to claim 1, wherein the management element interconnects the first and the second gateway network elements to the central management system, at least one of the first and the second gateway network elements employing a management communication channel that is incompatible with the central management system.

9. A switching module according to claim 8, wherein the first gateway network element employs an Internet Protocol (IP) stack and the second gateway network element employs an Open System Interconnection (OSI) stack.

10. A switching module according to claim 8, wherein the first and second gateway network elements employ an OSI stack, where the applications of the OSI stacks between the first and second gateway network elements are incompatible.

11. A switching module according to claim 1, further comprising an interface to interconnect with the central switching core to locally drop traffic from a tributary on a synchronous data transmission ring terminated on the first gateway network element.

12. A method in a switching module, comprising:
- terminating, by hardware gateway network elements, multiple synchronous data transmission rings on associated gateway network elements, the associated gateway network elements each including a gateway ADM (Add/Drop Multiplexer) for a switching center that interconnects multiple networks and providing a communication path for signals between the synchronous data transmission rings and network locations external to the synchronous data transmission rings;
- directly interconnecting, by a central switching core, the hardware gateway network elements through a central switching core that connects gateway network elements that terminate synchronous data transmission rings operating according to different protocols, where the core simultaneously supports TDM- (time-division multiplexing) and packet-based traffic; and
- interconnecting, by a management hardware element, the hardware gateway network elements to a central management system with a local management element, the local management element to natively communicate with the first and second hardware gateway network elements and the central management system in their respective protocols, the central management system to provide management signals to direct traffic flow on the synchronous data transmission rings.

13. A method according to claim 12, wherein terminating the synchronous data transmission rings comprises terminating the synchronous transmission rings with network elements manufactured by different vendors.

14. A method according to claim 12, wherein terminating the synchronous data transmission rings comprises terminating a Synchronous Digital Hierarchy (SDH) ring.

15. A method according to claim 12, wherein terminating the synchronous data transmission rings comprises terminating a Synchronous Optical Network (SONET) ring.

16. A method according to claim 12, wherein directly interconnecting the gateway network elements comprises switching traffic from a ring associated with a first network element directly onto a ring associated with a second network element via a packet-based switching fabric overlaid with a synchronous frame structure.

17. A method according to claim 16, wherein switching directly interconnecting the gateway network elements via the packet-based switching fabric comprises switching traffic from the ring associated with the first network element onto rings associated with other network elements.

18. A method according to claim 12, wherein interconnecting the gateway network elements with the local management element comprises interconnecting one or more network elements that employ a management communication channel that is incompatible with the central management system.

19. A method according to claim 18, wherein interconnecting the one or more network elements that employ the incompatible management communication channel comprises interconnecting a network element that employs an Internet Protocol (IP) stack with the central management system that supports an Open System Interconnection (OSI) stack and not the IP stack.

20. A method according to claim 18, wherein interconnecting the one or more network elements that employ the incompatible management communication channel comprises interconnecting a network element that employs a different, incompatible application of the OSI stack than an application of the OSI stack supported by the central management system.

21. A method according to claim 12, further comprising dropping to a local interface traffic from a tributary on one of the multiple synchronous data transmission rings.

22. An integrated switch comprising:
- a central switching core to directly interconnect a synchronous data transmission ring terminated on a first hardware gateway network element with an additional synchronous data transmission ring terminated on a second hardware gateway network element, where the synchronous data transmission ring and the additional synchronous data transmission ring operate according to different protocols, wherein the first and second hardware gateway network elements each include a gateway ADM (Add/Drop Multiplexer) to provide a communication path for signals between the synchronous data transmission rings and network locations external to the synchronous data transmission rings; and
- a local management hardware element to interconnect the integrated switch with a central management system, the local management element to natively communicate with the first and second gateway network elements and the central management system in their respective protocols, the central management system to provide management signals to direct traffic flow on the synchronous data transmission rings.

23. An integrated switch according to claim 22, wherein the central switching core interconnects synchronous data transmission rings terminated on gateway network elements manufactured by different vendors.

24. An integrated switch according to claim 22, wherein the central switching core comprises a switching platform to switch a traffic stream tributary from a first synchronous data transmission ring across multiple other synchronous data transmission rings.

25. An integrated switch according to claim 24, wherein the central switching core switches Protocol Data Unit (PDU) traffic and Time Division Multiplex (TDM) traffic across multiple rings via a single switching fabric.

26. An integrated switch according to claim 22, wherein the management element is adapted to interconnect with gateway network elements employing mutually incompatible management communication channels.

27. An integrated switch according to claim 26, wherein the mutually incompatible management channels include Internet Protocol (IP) over Data Communication Channel (DCC) and Open System Interconnection (OSI) over DCC.

28. An integrated switch according to claim 26, wherein the mutually incompatible management channels include incompatible applications of OSI over DCC.

29. An integrated switch according to claim 22, further comprising an interface to interconnect with the central switching core to locally drop traffic from a tributary on the synchronous data transmission ring terminated on the first gateway network element.

30. A method for operating an integrated switch, comprising:
- directly interconnecting a synchronous data transmission ring terminated on a first hardware gateway network element to an additional synchronous data transmission ring terminated on a second hardware gateway network element, where the synchronous data transmission ring and the additional synchronous data transmission ring operate according to different protocols, wherein the first and second gateway network elements each include a gateway ADM (Add/Drop Multiplexer) to provide a communication path for signals between the synchronous data transmission rings and network locations external to the synchronous data transmission rings; and maintaining a gateway management communication channel between a central management system and the first and second hardware gateway network elements with a management hardware element that natively communicates with the first and second hardware gateway network elements and the central management system in their respective protocols, the central management system to provide management signals to direct traffic flow on the synchronous data transmission rings.

31. A method according to claim 30, wherein directly interconnecting the synchronous data transmission rings comprises interconnecting synchronous data transmission rings terminated on gateway network elements manufactured by different vendors.

32. A method according to claim 30, wherein directly interconnecting the synchronous data transmission rings comprises switching a traffic stream tributary across the first and the second synchronous data transmission rings.

33. A method according to claim 30, wherein maintaining the gateway management communication channel comprises natively supporting multiple incompatible management communication channels.

34. A method according to claim 33, wherein natively supporting the multiple incompatible management channels includes supporting Internet Protocol (IP) over Data Communication Channel (DCC) and Open System Interconnection (OSI) over DCC.

35. A method according to claim 33, wherein natively supporting the multiple incompatible management channels includes supporting incompatible applications of OSI over DCC.

36. A method according to claim 30, further comprising dropping to a local interface traffic from the tributary on the synchronous data transmission ring terminated on the first gateway network element.

* * * * *